US005212487A

United States Patent [19]

Lee et al.

[11] Patent Number: 5,212,487

[45] Date of Patent: May 18, 1993

[54] APPARATUS AND METHOD FOR ADAPTIVE REMOTE TRANSMISSION

[75] Inventors: Sang-su Lee; Jun-ki Hong, both of Suwon, Rep. of Korea

[73] Assignee: SamSung Electronics Co., Ltd., Suwon, Rep. of Korea

[21] Appl. No.: 756,040

[22] Filed: Sep. 6, 1991

[30] Foreign Application Priority Data

May 1, 1991 [KR] Rep. of Korea ..................... 91-7013

[51] Int. Cl.[5] ........................ H04Q 9/00; G08C 19/00

[52] U.S. Cl. ................................ 346/176; 340/825.72

[58] Field of Search ................... 341/176; 340/825.72, 340/825.69

[56] References Cited

U.S. PATENT DOCUMENTS 4,855,746 8/1989 Stacy .................................. 341/176
4,866,434 9/1989 Keenan .............................. 341/176
5,028,919 7/1991 Hidaka .............................. 341/176

*Primary Examiner*—Glen R. Swann, III
*Attorney, Agent, or Firm*—Robert E. Bushnell

[57] ABSTRACT

An apparatus and a method for remote transmission adapted to a remote controller transmitting a radiated remote control optical signal for controlling remotely controlled appliances. Product control data or company control data, and signal formats corresponding to respective keys are stored in a memory in advance, so that, whenever one key selection is inputted, respective control data corresponding to the inputted key are transmitted in accordance with the product signal format.

14 Claims, 5 Drawing Sheets

FIG. 1A
FIG. 1B
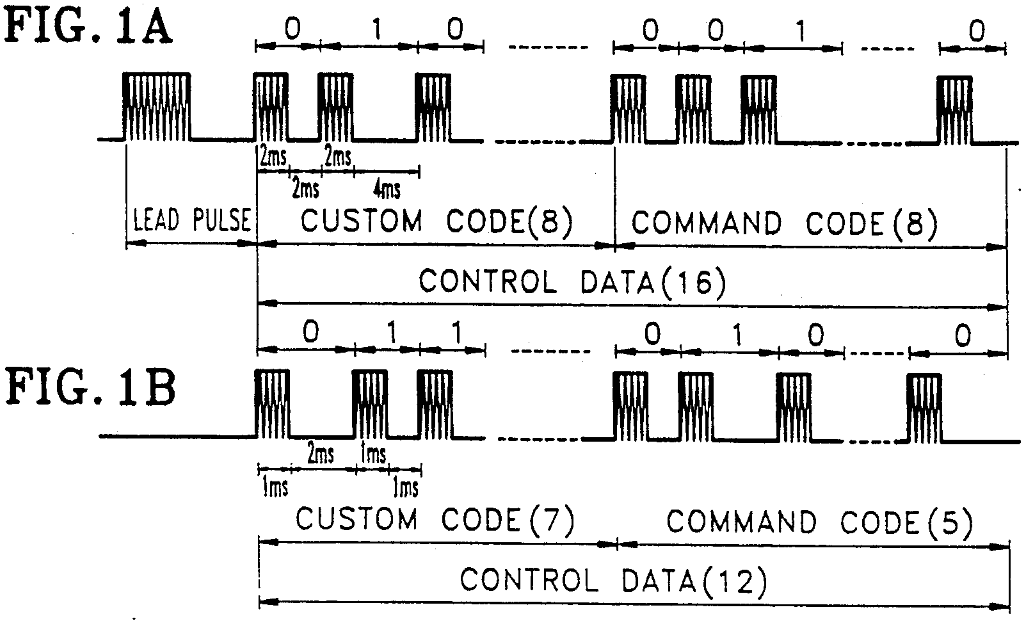
FIG. 2
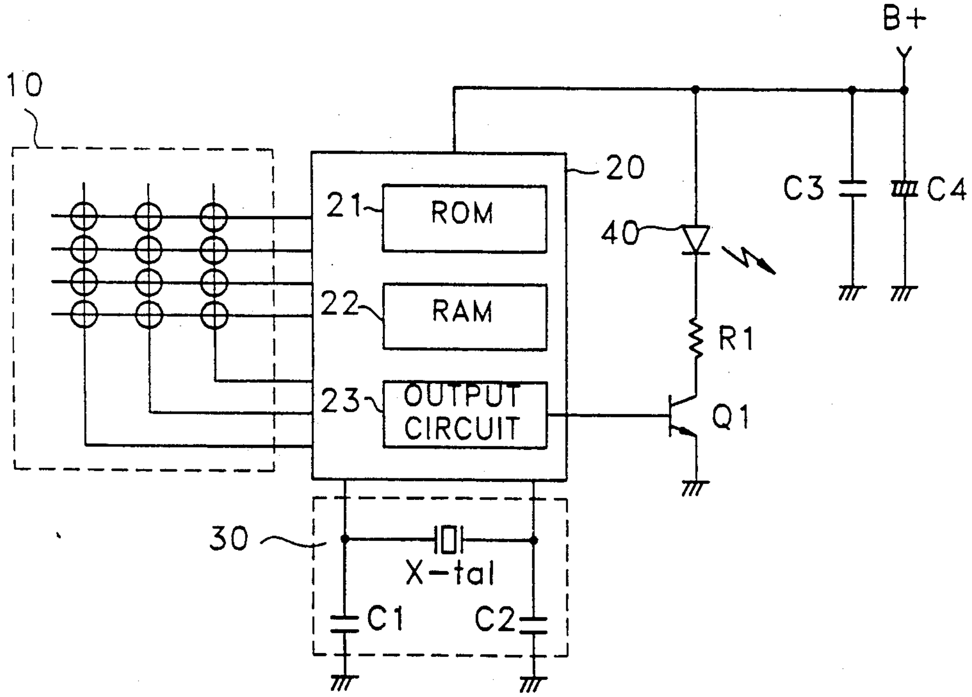

FIG. 3A

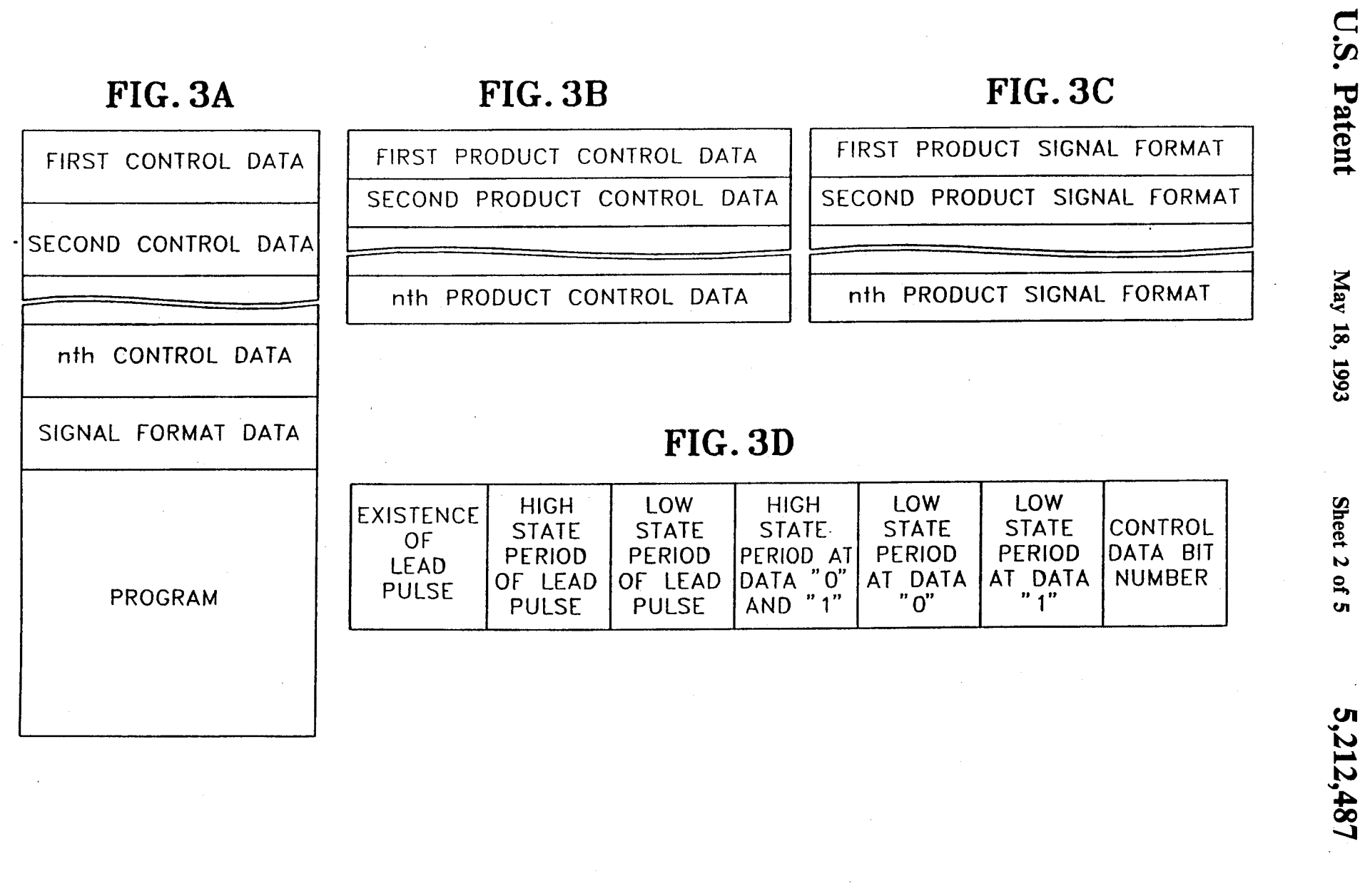

| |
|---|
| FIRST CONTROL DATA |
| SECOND CONTROL DATA |
| nth CONTROL DATA |
| SIGNAL FORMAT DATA |
| PROGRAM |

FIG. 3B

| |
|---|
| FIRST PRODUCT CONTROL DATA |
| SECOND PRODUCT CONTROL DATA |
| nth PRODUCT CONTROL DATA |

FIG. 3C

| |
|---|
| FIRST PRODUCT SIGNAL FORMAT |
| SECOND PRODUCT SIGNAL FORMAT |
| nth PRODUCT SIGNAL FORMAT |

FIG. 3D

| |
|---|
| EXISTENCE OF LEAD PULSE |
| HIGH STATE PERIOD OF LEAD PULSE |
| LOW STATE PERIOD OF LEAD PULSE |
| HIGH STATE PERIOD AT DATA "0" AND "1" |
| LOW STATE PERIOD AT DATA "0" |
| LOW STATE PERIOD AT DATA "1" |
| CONTROL DATA BIT NUMBER |

APPARATUS AND METHOD FOR ADAPTIVE REMOTE TRANSMISSION

BACKGROUND OF THE INVENTION

The present invention relates to a remote transmitting apparatus in a remote controller, and particularly to a remote transmitter and a method thereof which can control a plurality of appliances simultaneously.

Generally, a remote controller includes a portable remote transmitter and a remote receiver mounted on a controlled electric appliance which permits a user to control the controlled electric appliance from a distance away. If the user designates a control command to control the controlled electric appliance, a remote transmitter converts the control command into an infrared signal, and transmits the infrared signal to a remote receiver. Then, the remote receiver converts the transmitted infrared signal to an electrical signal which is in turn supplied to the controlled electric appliance.

Currently, the remote controller is being widely used for various house-hold electric appliances, such as a television set, a video cassette recorder, audio appliances, and the like. However, the infrared signal of the remote controller differs in dependence upon the format of the controlled electric appliance and its respective manufacturing brand. Therefore, there is a problem that the user can not control a variety of electric appliances from a distant position using just a single remote transmitter. Further, if the remote transmitter is lost or damaged, the remote control of a specific electric appliance is also lost. To solve the aforesaid problems, a specific company or a specific product having a specific code format is selected using a selection switch or a specially formed key combination for a remote transmission. However, there are also problems in that the selection switch has to be selected to correspond to a specific product and its manufacturing brand and moreover a plurality of electric appliances can not be controlled simultaneously.

SUMMARY OF THE INVENTION

Accordingly, the object of the present invention is to provide an adaptive remote transmitter and a method thereof which can remotely control a plurality of electric appliances, and which is compatible with other remote controlled electric appliances manufactured by different companies.

To achieve the object of the present invention, there is provided a device for adaptive remote transmission which comprises a key input for receiving a plurality of control commands; a micro-transmitter circuit which includes a memory for storing at least one signal format and at least one control data corresponding to each control command, thereby generating at least one electrical remote control signal corresponding to an inputted control command whenever the control command is input; and a converter for converting the output of the micro-transmitter circuit into the form of an optical signal, and then transmitting the optical signal.

The method of the present invention comprises the steps of entering a control command; generating at least one control data corresponding to the control command whenever the control command is entered; and transmitting at least one control data in the form of an optical signal.

BRIEF DESCRIPTION OF THE DRAWINGS

Other objects and advantages of the present invention will become more apparent by the following description with reference to the accompanying drawings, in which:

FIGS. 1A and 1B show the format of an infrared signal;

FIG. 2 illustrates an embodiment of an adaptive remote transmitter according to the present invention;

FIGS. 3A through 3D illustrate memory maps of a ROM shown in FIG. 2;

DETAILED DESCRIPTION OF THE INVENTION

Figure 4A:
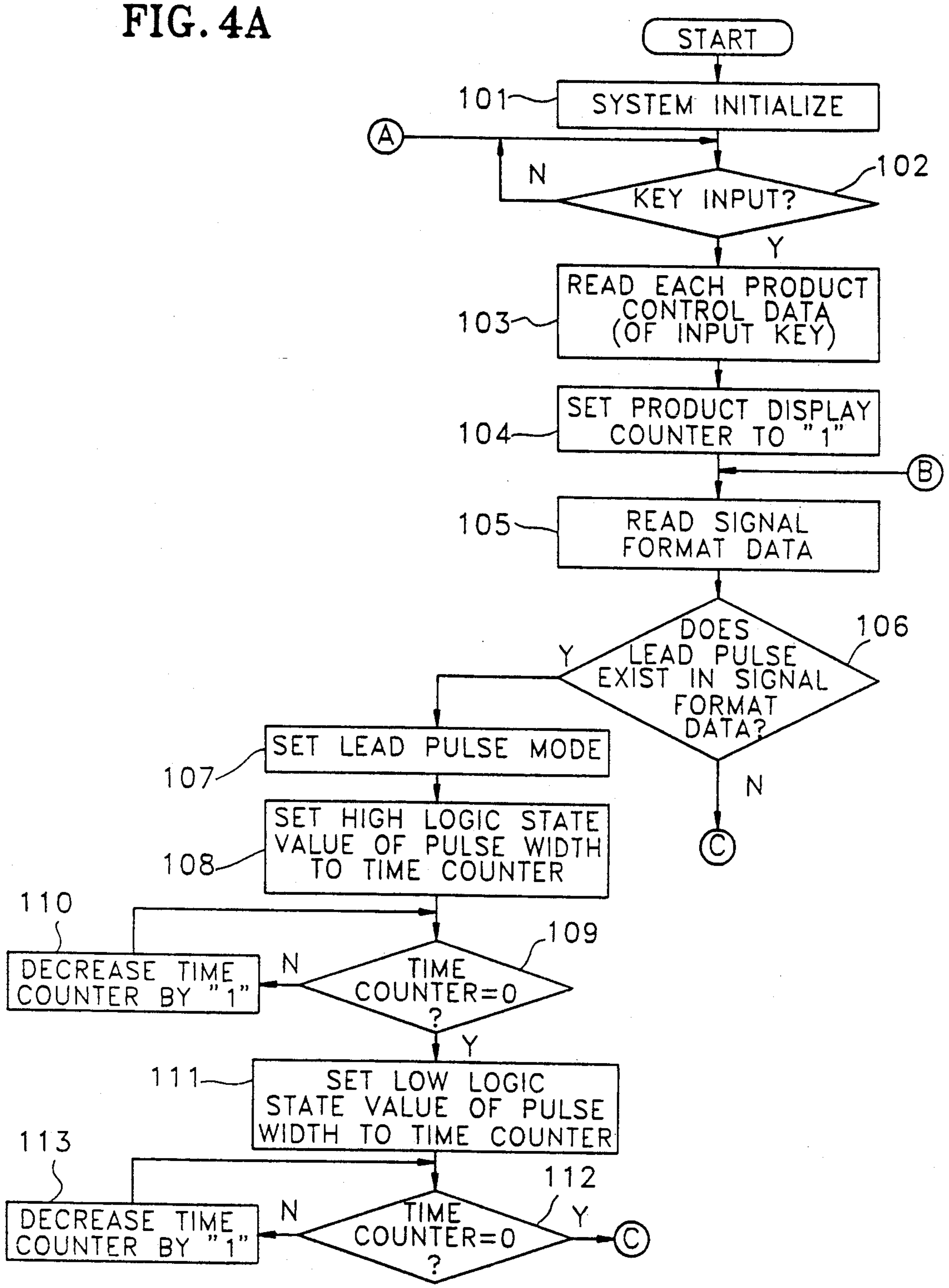
FIGS. 4A and 4B illustrate a flow chart of an embodiment of an adaptive remote transmission method according to the present invention.

The present invention will now be described in detail with reference to the accompanying drawings.

FIGS. 1A and 1B show a format of an infrared signal. FIG. 1A illustrates a waveform of the infrared signal having a lead pulse and a 16 bit control data in each frame.

FIG. 1B illustrates a waveform of the infrared signal having only the 16 bit control data in each line. In FIG. 1A, the data value "1" comprises of a high logic state signal having a pulse width of 2 m/s, and a low logic state signal having a pulse width of 4 m/s, while the data value "0" comprises of a high logic state signal and a low logic state signal, each having a pulse width of 2 m/s. In FIG. 1B, the data value "1" comprises of a high logic state signal and a low logic state signal having a pulse width of 1 m/s, while the data value "0" has a high logic state signal having a pulse width of 1 m/s, and a low logic state signal having a pulse width of 2 m/s.

FIG. 2 is a circuit diagram of an embodiment of an adaptive remote transmitter according to the present invention.

In FIG. 2, a key matrix 10 is connected to a key-scan port of a micro-transmitter circuit 20. Both terminals of a crystal oscillator X-tal are connected to both clock terminals of the micro-transmitter circuit 20. Capacitors C1 and C2 are each connected to the terminals of the crystal oscillator X-tal and to ground GND. The output terminal of the micro-transmitter circuit 20 is connected to the base of a transistor Q1. The emitter of the transistor Q1 is connected to ground GND. An infrared diode 40 and a resistor R1 are serially connected between a power source B+ and the collector of the transistor Q1. Capacitors C3 and C4 are connected in parallel between the power source B+ and ground GND. A portion 30 composed of the capacitors C1 and C2 and the crystal oscillator X-tal is a clock generator. The micro-transmitter circuit 20 includes a ROM 21, a RAM 22, and an output circuit 23 therein.

The operation of the apparatus illustrated in FIG. 2 is performed as follows. First, a clock pulse train is generated from the clock generator 30 for operating the micro-transmitter circuit 20. The frequency of the clock pulse train is determined by the value of capacitance of the two capacitors C1 and C2, and is set at approximately 455 KHz.

The micro-transmitter circuit 20 operates in response to the output of the clock generator 30. The microtransmitter circuit 20, repeatedly scanning the key matrix 10, receives a control command designated by a user. When a key selection is made from among the key matrix 10, the micro-transmitter circuit 20 reads out a plurality of product signal formats and a plurality of product control data corresponding to the selected key, from the ROM 21 which is included therein. Then, the product control data corresponding to the selected key is formed to be a specific format signal which is then supplied to the base of the transistor Q1 through the output terminal. The signal at the output terminal of the micro-transmitter circuit 20 is in the form of a frequency shift keying (hereinafter referred to as FSK) signal.

The transistor Q1 is switched on/off in accordance with the FSK signal applied from the output terminal of the micro-transmitter circuit 20 to the base, thereby opening/closing the current path of the infrared diode.

The infrared diode 40 is turned on when the current path is opened by the transistor Q1, and is turned off when the current path is closed. At this time, the resistor R1 limits the amount of current flow through the infrared diode 40.

The capacitors C3 and C4 make the supply voltage stable, and also eliminate noise.

Additionally, the RAM 22 temporarily stores data which is generated when the micro-transmitter circuit 20 is processing information. The output circuit 23 converts the control data for the respective products into signals of the signal formats for the respective products which in turn are converted into the FSK signals. The ROM 21 stores various control data, signal format data, and the operating program respectively corresponding to products or the manufacturing companies, with respect to the various key selections in matrix 10.

FIGS. 3A through 3D show memory maps of the ROM 21 illustrated in FIG. 2. In FIG. 3A, first to nth control data are the respective information corresponding to the keys included in the key matrix 10; signal format data is the information of each product's signal format; and a program is the information concerning the adaptive remote transmitting method.

FIG. 3B is a detailed view of the first to nth data illustrated in FIG. 3A. Here, each product control data includes a custom code having a specific address for each product, and a command code corresponding to a key. FIG. 3C is a detailed view of the signal format data illustrated in FIG. 3A; and FIG. 3D is a detailed view illustrating the first to nth product signal formats shown in FIG. 3C.

Figure 4B:
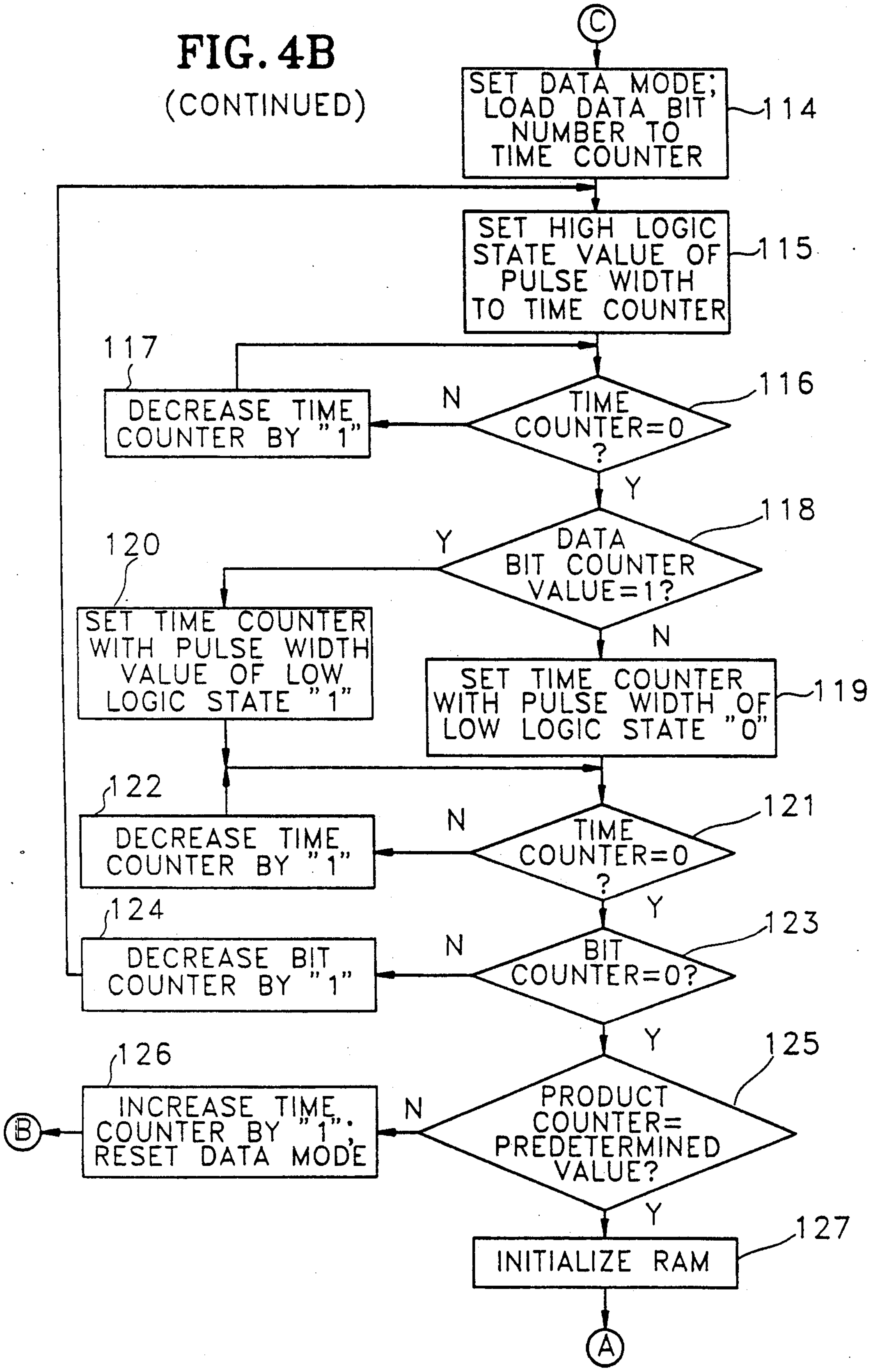

FIG. 4 is a flow chart of an embodiment of a method for performing the adaptive remote transmission method according to the present invention whose program is stored in the ROM 21 of FIG. 2.

FIG. 4 will be described in detail with reference to FIGS. 1A through 3D.

In step 101, when a power source is turned on, the micro-transmitter circuit 20 resets the RAM 22 and the input/output port to initialize the system.

Thereafter, in step 102, the micro-transmitter circuit 20 scans the key matrix 10 through a key-scan port until a certain key input out of a plurality of key inputs is entered.

In step 103, when a certain key is input from the key matrix 10 in the step 102, the micro-transmitter circuit 20 reads out the respective product control data corresponding to the input key as illustrated in FIG. 3B, from the ROM 21, and stores the product control data in the RAM 22.

After the execution of the step 103, the micro-transmitter circuit 20 sets the value "1" to the product display counter addressed to the RAM 22, in step 104.

After step 104, the micro-transmitter circuit 20 reads out signal format data illustrated in FIG. 3D which corresponds to the value of the product display counter illustrated in FIG. 3D, and then, stores the signal format data in the RAM 22, in step 105.

After step 105, the micro-transmitter circuit 20 checks the logic of the data for specifying the existence of the lead pulse, from among the signal format data signals stored in the RAM 21, and then, determines whether or not the lead pulse should be added to the infrared signal to be output, in step 106. At this time, if the value of the data for specifying the existence of the lead pulse is "1", it is determined that the lead pulse must be added. On the other hand, if the value is "0", the lead pulse will not be inserted. The form of the infrared signal to be generated is therefore, determined in accordance with the infrared signals as illustrated in FIGS. 1A and 1B.

In step 107, if the value of the data for specifying the existence of the lead pulse is "1" at step 106, the micro-transmitter circuit 20 sets a lead pulse mode flag addressed to the RAM 22, and sets the lead pulse mode.

After implementing step 107, the micro-transmitter circuit 20 supplies a logic signal at a high logic state to the output circuit 23, and sets the value of the lead pulse width at the high logic state among the signal format data to a time counter addressed to the RAM 22, in step 108. At this time, the output circuit 23 supplies the clock pulse train received from the clock generator 30 to the base of the transistor Q1, thereby enabling the operation of the transistor Q1. The infrared diode 40 is continuously turned on and off in response to the operation of the transistor Q1.

After performing the step 108, the micro-transmitter circuit 20 checks whether the value of the time counter is "0" or not, in step 109.

In step 110, if the value of the time counter is not "0" in step 109, the micro-transmitter circuit 20 decreases the value of the time counter by "1" at the rising edge of the clock pulse received from the clock generator 30, and then returns to step 109.

In step 111, if the value of the time counter is "0" in the step 109, the micro-transmitter circuit 20 inverts the logic state of the signal which was supplied to the output circuit 23, from high to low, and sets the value of the lead pulse width at the low logic state among the signal format data to the time counter. At this time, the output circuit 23 supplies the logic signal at low logic state to the base of the transistor Q1, turning off the transistor Q1. Then, the infrared diode 40 is turned off.

After step 111, the micro-transmitter circuit 20 checks whether the value of the time counter is "0" or not, in step 112.

In step 113, if the value of the time counter is not "0" in step 112, the micro-transmitter circuit 20 decreases the value of the time counter by "1", at the rising edge of the clock pulse received from the clock generator 30, then returns to step 112.

In step 114, if the value of the time counter is "0" in step 112, or, when the value of the data for displaying the existence of the lead pulse is "0" in step 106, the micro-transmitter circuit 20 resets the lead pulse flag addressed to the RAM 22, and instead sets the data mode flag addressed to the RAM 22 to the sample data mode. Then, the micro-transmitter circuit 20 sets the bit number of the control data out of the signal format data to the data bit counter which will be addressed to the RAM 22.

After carrying out step 114, the micro-transmitter circuit 20 supplies the logic signal at the high logic state to the output circuit 23, to turn on and off the infrared diode 40, then sets the value of the pulse width corresponding to the high logic state out of the signal format data, to the time counter, in step 115.

After completing step 115, the micro-transmitter circuit 20 checks whether the value of the time counter is "0" or not, in step 116.

In step 117, if the value of the time counter is not "0" in step 116, the micro-transmitter circuit 20 decreases the value of the time counter by "1" at the rising edge of the clock pulse train received from the clock generator 30, then returns to step 116.

In step 118, when the value of the time counter is "0" in step 116, the micro-transmitter circuit 20 checks whether the value of the control data of the bit corresponding to the value of the data bit counter is "1" or not.

In step 119, when the value of the control data of the bit corresponding to the data bit counter is "0" in step 118, the micro-transmitter circuit 20 sets the value of the pulse width at the low logic state corresponding to the data value "0" out of the signal format data stored in the RAM 22, to the time counter.

In step 120, if the value of the control data of the bit corresponding to the data bit counter is "1" in step 118, the micro-transmitter circuit 20 sets the value of the pulse width at the low logic state corresponding to the data value "1" out of the signal format data stored in the RAM 22, to the time counter.

After performing step 119 or step 120, the micro-transmitter circuit 20 checks whether the value of the time counter is "0" or not, in step 121.

In step 122, if the value of the time counter is not "0" in step 121, the micro-transmitter circuit 20 decreases the value of the time counter by "1" at the rising edge of the clock pulse train received from the clock generator 30, then returns to the step 121.

In step 123, when the value of the time counter is "0" in step 121, the micro-transmitter circuit 20 checks whether the value of the data bit counter is "0" or not.

In step 124, when the value of the data bit counter is not "0", the micro-transmitter circuit 20 decreases the value of the data bit counter by "1", then returns to step 115.

In step 125, if the value of the data bit counter is "0" in step 123, the micro-transmitter circuit 20 checks whether the value of the product display counter is the predetermined value. At this time, a smaller value of the product display counter than the predetermined value means that control data for other products remains. Otherwise, when the value of the product display counter is the same as the predetermined value, there is no more control data to be output.

In step 126, when the value of the product display counter is smaller than the predetermined value in the step 125, the micro-transmitter circuit 20 increases the value of the product display counter by 1, resets the signal format data stored in the RAM 22, and then returns to step 105.

In step 127, when the value of the product display counter is the same as the maximum value in step 125, the micro-transmitter circuit 20 initializes the information stored in the RAM 22, then returns to step 102.

Figure 5:
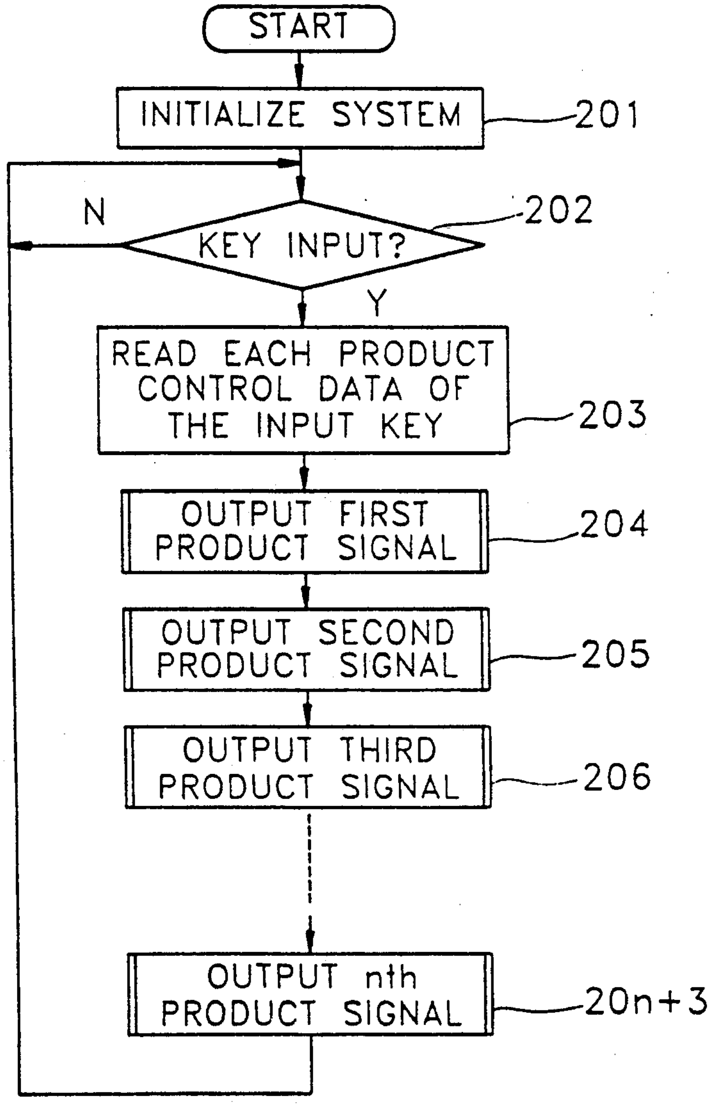
FIG. 5 is an abbreviated illustration illustration of the flow chart in FIG. 4.

FIG. 5 is a flow chart schematically briefly representing the flow chart in FIG. 4 to further the understanding the present invention.

In step 201, the micro-transmitter circuit 20 resets the input/output port and the RAM 22 to initialize the system when the power source (battery) is turned on.

After performing step 201, the micro-transmitter circuit 20 scans the key matrix 10, then waits until a key is selected from among a variety of keys, in step 202.

In step 203, when one key is input in step 202, the micro-transmitter circuit 20 reads out the respective product control data corresponding to the input key from the ROM 21, then stores the read out data to the RAM 22.

After the step 203, the micro-transmitter circuit 20 transmits the product control data sequentially in accordance with each of the product signal formats, from step 204 through step 20n+3 stages.

As described above, in the present invention, since a product signal format or a particular manufacturing company signal format and product control data or company control data corresponding to respective key inputs are stored in a memory in advance, infrared signals determined by a product or a manufacturing company corresponding to a key selection are sequentially transmitted. Therefore, the present invention is advantageous in that a variety of electric appliances can be simultaneously controlled, and further, the electric appliances which are manufactured by different companies can be adaptively controlled from a single remote source.

What is claimed is:

1. A remote transmitting apparatus in a remote controller for transmitting a remote control signal, comprising:

key input means for receiving a plurality of control commands;

microtransmitter means comprising memory means having a ROM and a RAM, said ROM storing a plurality of signal formats and a plurality of appliance control data strings for controlling electronic appliances in response to a user's control commands, whereby, responsive to each of said control commands, one appliance control data string stored in said ROM is read out and temporarily stored in said RAM, then one signal format stored in said ROM and corresponding to said one appliance control data string is read out and stored in said RAM, then one remote control data string corresponding to said appliance control data string and said signal format stored in said RAM is generated in dependence upon a clock signal, and then another appliance control data string stored in said ROM is read out and temporarily stored in said RAM, and another corresponding signal format stored in said ROM is read out and stored in said RAM to generate another corresponding remote control data string until a remote control data string corresponding to each control command is generated; and means for converting the output of said micro-transmitter means into an optical signal, and for transmitting said optical signal so as to simultaneously control plural electronic appliances.

2. The remote transmitting apparatus as claimed in claim 1, wherein each said control data string includes a custom code for representing a specific brand of electronic appliance, and a command code for representing a control command corresponding to each key selection.

3. The remote transmitting apparatus as claimed in claim 1, wherein each said signal format includes information for specifying the existence or absence of a lead pulse and data values corresponding to each pulse width of said signal format.

4. The remote transmitting apparatus as claimed in claim 3, wherein each said signal format further includes information which designates the values of the pulse width in a high logic state and a low logic state subsequent to the lead pulse.

5. The remote transmitting apparatus as claimed in claim 4, wherein each said signal format further includes information which represents the number of bits in each control data string.

6. The remote transmitting apparatus as claimed in claim 1, wherein each said signal format still further includes information which represents the number of bits in each control data string.

7. A method for sequentially controlling plural electronic appliances using a remote controller having a key input a micro-transmitter having a ROM and a RAM, and an optical signal converter, comprising the steps of:

receiving a plurality of user's key inputs;

generating a remote control data string corresponding to each said user's key input whereby, corresponding to each said user's key input, an appliance control data string stored in said ROM is read out and temporarily stored in said RAM, then a signal format stored in said ROM and corresponding to said appliance control data string is read out and stored in said RAM, then one remote control data string corresponding to said appliance control data string and said signal format stored in said RAM is generated in dependence upon a clock signal until remote control data strings corresponding to each user's key input are generated; and converting and transmitting plural remote control data strings in the form of optical signals so as to simultaneously control said plural electronic appliances.

8. A method as claimed in claim 7, wherein the signal format for a selected electronic appliance further comprises information indicative of an existence or an absence of a lead pulse, data values corresponding to each pulse width and the number of bits in each control data string.

9. A remote control transmitter for sequentially controlling a plurality of electronic appliances, comprising:

key matrix means for entering a plurality of command signals from a user; and transmitter means comprising memory means for storing a plurality of transmission formats respectively representative of format structures for said plurality of electronic appliances, and a plurality of appliance control data strings having custom codes corresponding to specific ones of the electronic appliances and command codes corresponding to each said command signal, for transmitting a single remote control signal in response to each said command signal to sequentially enable a plurality of electronic appliances, said remote control signals controlling said plurality of electronic appliances with a sequence of data control blocks each having a selected appliance control data string and a selected transmission format for simultaneously controlling selected electronic appliances in dependence upon said command signals.

10. The remote control transmitter as claimed in claim 9, further comprising means for converting said remote control signal into an optical prior to transmission by said transmitter means.

11. The remote control transmitter as claimed in claim 9, wherein said memory means comprises a read-only-memory and a random-access memory.

12. The remote control transmitter as claimed in claim 9, wherein the selected transmission format for a selected electronic appliance further comprises information indicative of an existence or an absence of a lead pulse, data values corresponding to each pulse width, and the number of bits in each appliance control data string.

13. A remote control transmitter for sequentially controlling a plurality of electronic appliances, comprising:

key matrix means for receiving a plurality of command signals from a user via a plurality of selection keys; and transmitter means for transmitting at least one single remote control signal having a sequence of data control blocks for sequentially controlling a plurality of electronic appliances in dependence upon said command signals from said user, said transmitter means comprising:

first memory means for storing a plurality of transmission formats respectively representative of a format structure for each of said plurality of electronic appliances, a plurality of appliance control data strings having custom codes corresponding to specific ones of the electronic appliances and command codes corresponding to said plurality of command signals from said user, and an operating program for enabling a sequential reading of said transmission formats and said appliance control data strings in dependence upon reception of said command signals;

second memory means for temporarily storing said transmission formats and said appliance control data strings from said first memory means;

means for generating said single remote control signal in said sequence of data control blocks having selected appliance control data strings and selected transmission formats for sequentially controlling a plurality of electronic appliances as dependence upon a clock signal; and means for transmitting said single remote control signal in an infrared signal.

14. The remote control transmitter as claimed in claim 13, wherein said selected transmission format for a selected electronic appliance further comprises information indicative of an existence or absence of a lead pulse, data values corresponding to each pulse width, and the number of bits in each appliance control data string.

* * * * *

UNITED STATES PATENT AND TRADEMARK OFFICE

CERTIFICATE OF CORRECTION

PATENT NO. :5,212,487
DATED :18 May 1993
INVENTOR(S) :Sang-Su Lee, et al.

It is certified that error appears in the above-indentified patent and that said Letters Patent is hereby corrected as shown below:

Column 6, Line22, change "particualar" to --particular--:

Signed and Sealed this

Nineteenth Day of August, 1997

Attest:

BRUCE LEHMAN

Attesting Officer

*Commissioner of Patents and Trademarks*